(12) United States Patent
Kaneko et al.

(10) Patent No.: US 8,388,589 B2
(45) Date of Patent: Mar. 5, 2013

(54) PET SHEET

(75) Inventors: Shinya Kaneko, Tokyo (JP); Takeshi Ikegami, Tokyo (JP)

(73) Assignee: Uni-Charm Corporation, Shikokuchuo-shi (JP)

( * ) Notice: Subject to any disclaimer, the term of this patent is extended or adjusted under 35 U.S.C. 154(b) by 507 days.

(21) Appl. No.: 12/171,883

(22) Filed: Jul. 11, 2008

(65) Prior Publication Data

US 2008/0271679 A1    Nov. 6, 2008

Related U.S. Application Data

(62) Division of application No. 11/032,105, filed on Jan. 11, 2005, now abandoned.

(30) Foreign Application Priority Data

Jan. 16, 2004 (JP) .................................. 2004-9537

(51) Int. Cl.
*A61F 13/15* (2006.01)
*A61F 13/20* (2006.01)
*A01K 29/00* (2006.01)

(52) U.S. Cl. .................... 604/385.01; 604/358; 119/171

(58) Field of Classification Search .................. 604/358; 119/169, 172, 163, 170, 165
See application file for complete search history.

(56) References Cited

U.S. PATENT DOCUMENTS

| | | | |
|---|---|---|---|
| 3,284,273 A * | 11/1966 | Prentice | 428/76 |
| 4,800,677 A * | 1/1989 | Mack | 119/171 |
| 5,558,655 A * | 9/1996 | Jezzi et al. | 604/378 |
| 5,630,376 A * | 5/1997 | Ochi et al. | 119/169 |
| 6,227,145 B1 | 5/2001 | Miyamoto et al. | |
| 6,231,556 B1 * | 5/2001 | Osborn, III | 604/385.08 |
| 6,244,216 B1 * | 6/2001 | Ochi | 119/171 |
| 6,458,111 B1 * | 10/2002 | Onishi et al. | 604/385.01 |
| 6,460,484 B2 | 10/2002 | Ikegami et al. | |
| 6,897,350 B2 * | 5/2005 | Yagou et al. | 604/372 |
| 6,911,574 B1 * | 6/2005 | Mizutani | 604/380 |
| 7,094,227 B2 * | 8/2006 | Ishiguro et al. | 604/385.25 |
| 7,231,888 B1 * | 6/2007 | Kelly et al. | 119/28.5 |
| 2003/0094140 A1 | 5/2003 | Otsuji et al. | |
| 2003/0187417 A1 * | 10/2003 | Kudo et al. | 604/379 |
| 2006/0189954 A1 * | 8/2006 | Kudo et al. | 604/380 |
| 2006/0200104 A1 * | 9/2006 | Kaneko et al. | 604/358 |
| 2007/0073256 A1 * | 3/2007 | Ponomarenko et al. | 604/385.13 |
| 2009/0044756 A1 * | 2/2009 | Otsuji et al. | 119/169 |

FOREIGN PATENT DOCUMENTS

| | | |
|---|---|---|
| DE | 2748348 A1 | 5/1979 |
| DE | 10012998 A1 | 9/2001 |
| EP | 1312257 A1 | 11/2002 |
| JP | 11-332413 | 12/1999 |
| JP | 2001-218535 | 8/2001 |

OTHER PUBLICATIONS

Japanese Office Action mailed on Jul. 8, 2008 directed towards counterpart foreign application No. 2004-009537.
Kaneko et al., U.S. Office Action mailed on Aug. 22, 2005, directed to related U.S. Appl. No. 11/032,105; 10 pages.
Kaneko et al., U.S. Office Action mailed on Feb. 14, 2006, directed to related U.S. Appl. No. 11/032,105; 7 pages.
Kaneko et al., U.S. Office Action mailed on Sep. 15, 2006, directed to related U.S. Appl. No. 11/032,105; 8 pages.
Kaneko et al., U.S. Office Action mailed on Apr. 18, 2007, directed to related U.S. Appl. No. 11/032,105; 7 pages.
Kaneko et al., U.S. Office Action mailed on Dec. 26, 2007, directed to related U.S. Appl. No. 11/032,105; 8 pages.
Kaneko et al., U.S. Office Action mailed on Apr. 21, 2008, directed to related U.S. Appl. No. 11/032,105; 7 pages.

\* cited by examiner

*Primary Examiner* — Susan Su
(74) *Attorney, Agent, or Firm* — Morrison & Foerster LLP

(57) ABSTRACT

Disclosed is a pet sheet including a backsheet, a liquid-permeable topsheet and a liquid absorbent layer which is smaller than the backsheet and disposed between the backsheet and the topsheet. The backsheet extends beyond the liquid absorbent layer to provide side regions outside the liquid absorbent layer. A hydrophilic sheet is provided above the backsheet in the side regions.

13 Claims, 7 Drawing Sheets

PET SHEET

CROSS-REFERENCE TO RELATED APPLICATION

This application is a divisional application of U.S. Ser. No. 11/032,105, filed Jan. 11, 2005, which claims the benefit of Japanese application 2004-009537, filed Jan. 16, 2004, the entirety of which is incorporated herein by reference.

BACKGROUND OF THE INVENTION

1. Field of the Invention

The present invention relates to a pet sheet intended to absorb liquid such as urine discharged from pets such as dogs or cats.

2. Description of the Related Art

Pet sheets (absorbent sheets for pets) have been used for absorbing liquid such as urine discharged from household pets such as dogs or cats. Typically, the pet sheets employ a structure as shown in FIG. 13.

FIG. 13 shows a pet sheet 1 comprising a liquid-impermeable backsheet 2, a liquid absorbent layer 3 formed of absorbent materials such as pulp and laid on the backsheet 2, and a liquid-permeable topsheet 4 covering the upper side of the liquid absorbent layer 3. Along an end 1A of the pet sheet 1, the backsheet 2 is folded back to have its edge 2a on the upper side of the liquid absorbent layer 3, covering an end 3a of the liquid absorbent layer 3. Accordingly, urine applied to the upper side of the pet sheet 1 in a side region of a width (i) cannot readily migrate to the liquid absorbent layer 3 due to the presence of the liquid-impermeable backsheet 2. Thus, urine is liable to puddle in the side region or flow down the side region to reach a floor surface outside the pet sheet 1. For example, Japanese Unexamined Patent Publication No. 2001-218535 discloses a pet sheet of this construction.

SUMMARY OF THE INVENTION

The present invention has been developed in view of the shortcomings in the prior art set forth above. It is therefore an object of the present invention to provide a pet sheet with side regions having improved ability to absorb liquid.

According to the present invention, there is provided a pet sheet comprising a backsheet, a liquid-permeable topsheet and a liquid absorbent layer which is smaller than the backsheet and disposed between the backsheet and the topsheet, wherein the backsheet extends beyond the liquid absorbent layer to provide side regions outside the liquid absorbent layer and a hydrophilic sheet is provided above the backsheet in the side regions.

In the pet sheet of the present invention, urine applied to the side regions can be absorbed in the hydrophilic sheet so as not to leave a puddle in the side regions. Moreover, urine thus absorbed can readily migrate to the liquid absorbent layer via the hydrophilic sheet.

Preferably, both the backsheet and the liquid absorbent layer are rectangular and the side regions are provided along all four sides of the liquid absorbent layer.

In the side regions, the hydrophilic sheet may be laid on the backsheet. Here, the topsheet may extend beyond the liquid absorbent layer to cover the hydrophilic sheet in the side regions.

The hydrophilic sheet may extend between the liquid absorbent layer and the topsheet and beyond the liquid absorbent layer into the side regions. The hydrophilic sheet thus provided facilitates migration of urine from the side regions to the liquid absorbent layer.

According to an alternative embodiment, the topsheet may be located between the backsheet and the hydrophilic sheet in the side regions.

Preferably, the topsheet is an apertured resin film, the liquid absorbent layer is an absorbent core covered with a tissue paper, and the hydrophilic sheet is a nonwoven fabric that is greater in both thickness and basis weight than the tissue paper. The nonwoven fabric may be in contact with the liquid absorbent layer.

BRIEF DESCRIPTION OF THE DRAWINGS

The present invention will be understood more fully from the detailed description given hereinafter and from the accompanying drawings of the preferred embodiments of the present invention, which, however, should not be taken to limit to the invention, but are for explanation and understanding only.

In the drawings.

DETAILED DESCRIPTION OF THE INVENTION

The present invention will be discussed hereinafter in detail in terms of the preferred embodiments according to the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order not to obscure the features of the present invention.

Figure 1:
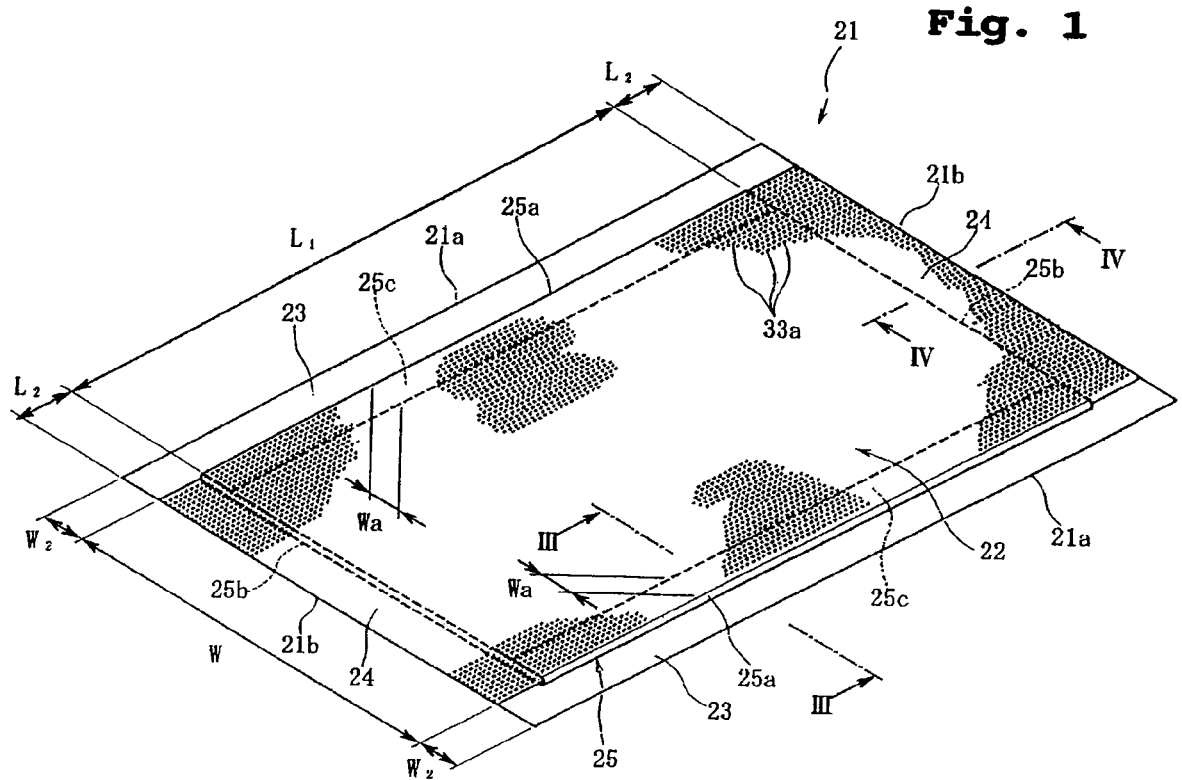
FIG. 1 is a perspective view showing a pet sheet according to a first embodiment of the present invention.
Figure 2:
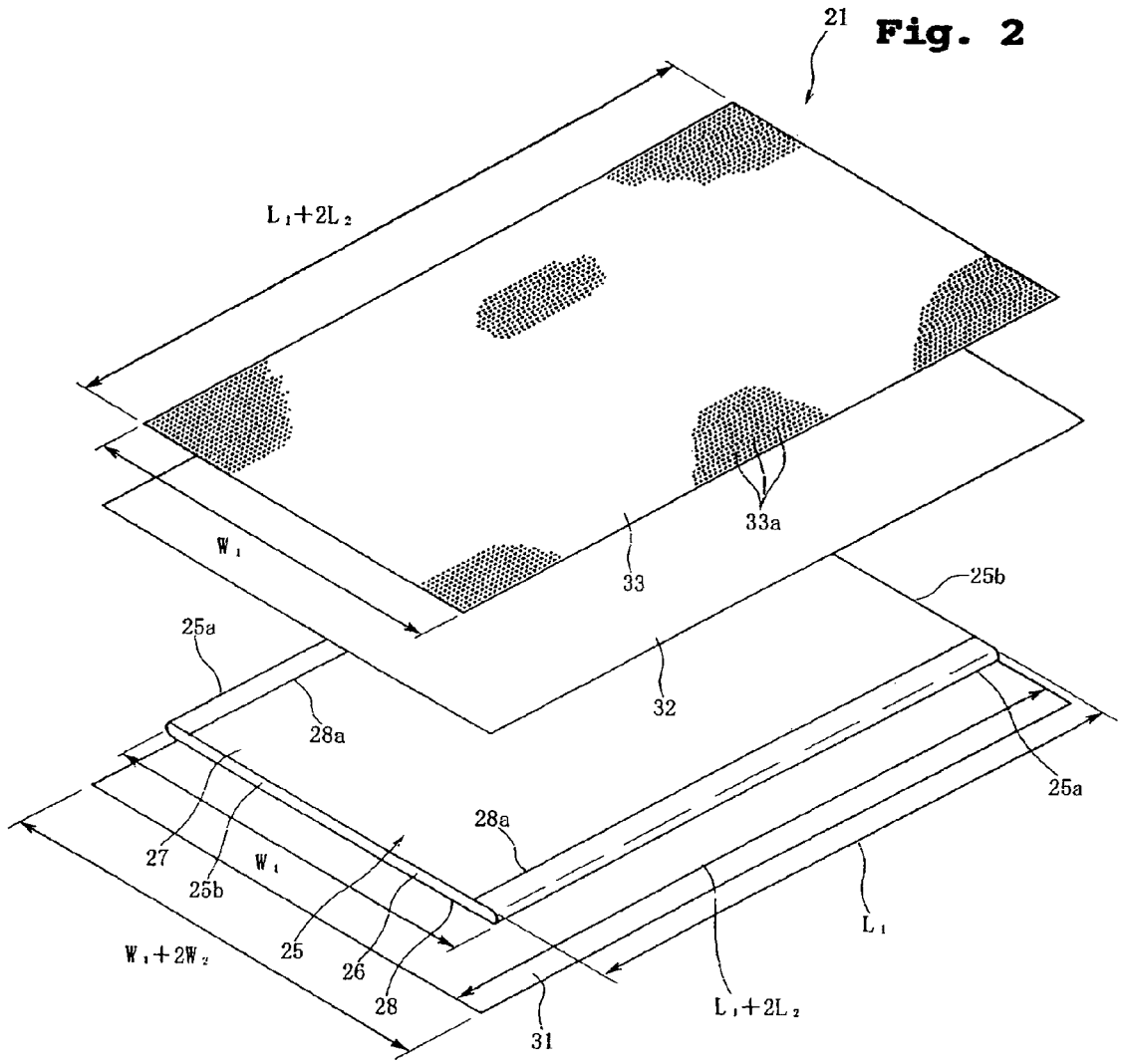
FIG. 2 is an exploded perspective view showing individual components of the pet sheet of FIG. 1.
Figure 3:
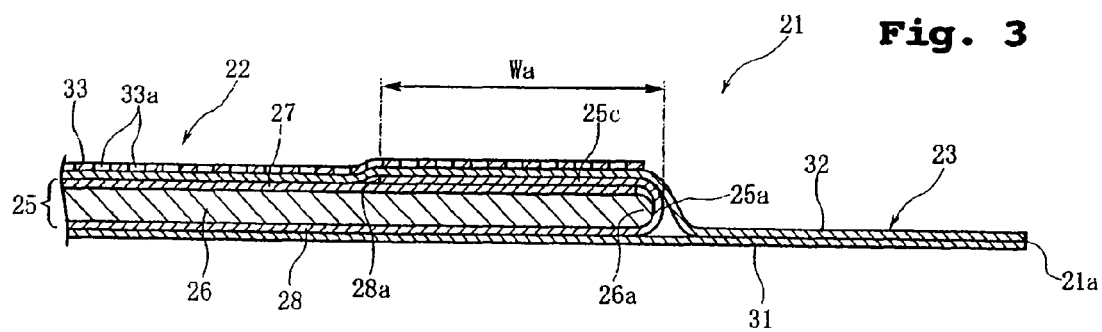
FIG. 3 is a sectional view taken along line III-III of FIG. 1.
Figure 4:
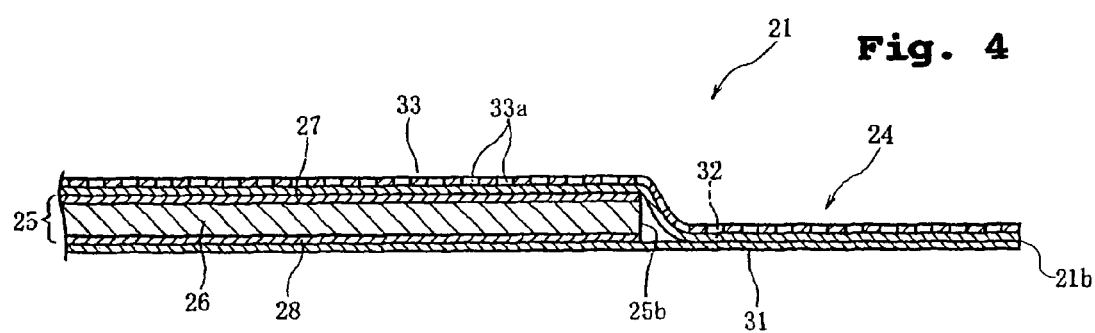
FIG. 4 is a sectional view taken along line IV-IV of FIG. 1.
Figure 5:
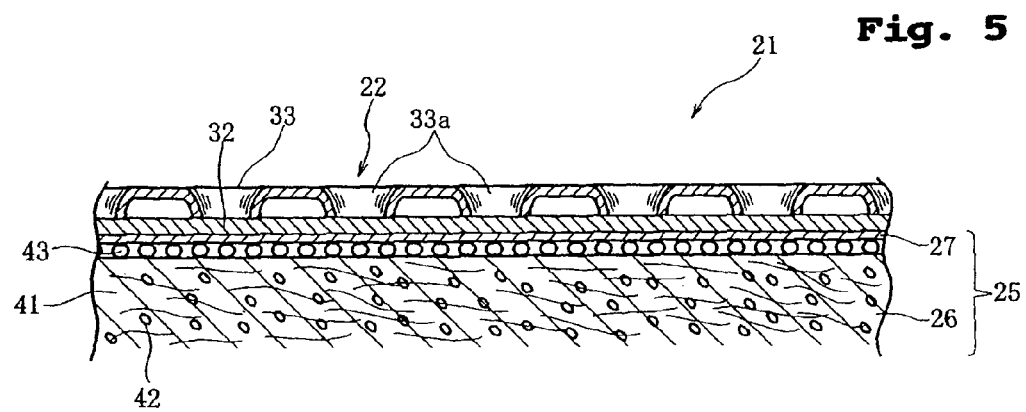
FIG. 5 is an enlarged sectional view showing a topsheet, a hydrophilic sheet and a liquid absorbent layer.

FIG. 1 is a perspective view showing a pet sheet 21 according to a first embodiment of the present invention; FIG. 2 is an exploded perspective view showing individual components of the pet sheet 21; FIG. 3 is a sectional view taken along line III-III of FIG. 1; FIG. 4 is a sectional view taken along line IV-IV of FIG. 1; and FIG. 5 is an enlarged sectional view showing a topsheet, a hydrophilic sheet and a liquid absorbent layer.

Referring to FIG. 1, the pet sheet 21 is generally rectangular. The pet sheet 21 has a center region 22 of a length L1 and a width W1. Laterally outside the center region 22, long side regions 23 of a width W2 are provided along long sides 21a of the pet sheet 21. Longitudinally outside the center region 22, short side regions 24 of a width L2 are provided along short sides 21b of the pet sheet 21.

The center region 22 refers to a region where a liquid absorbent layer 25 is present (see FIG. 2). Therefore, the long side regions 23 are defined between long sides 25a of the liquid absorbent layer 25 and the long sides 21a of the pet sheet 21; the short side regions 24 are defined between short sides 25b of the liquid absorbent layer 25 and the short sides 21b of the pet sheet 21.

The length L1 and width W1 of the center region 22 may vary depending on the pet's length. For example, the length L1 may be set within the range of 400 to 900 mm and the width W1 within the range of 250 to 600 mm.

The width W2 of the side region 23 and the width L2 of the side region 24 are preferably equal to or greater than 10 mm. Their upper limit is about 70 mm. The width W2 of the side region 23 and the width L2 of the side region 24 may be equal to or different from each other.

As shown in FIG. 2, the pet sheet 21 comprises a liquid-impermeable backsheet 31, the liquid absorbent layer 25 disposed on the upper side of the backsheet 31, a hydrophilic sheet 32 covering the upper side of the liquid absorbent layer 25 and a liquid-permeable topsheet 33 disposed on the upper side of the hydrophilic sheet 32.

The backsheet 31 and the hydrophilic sheet 32 are coextensive with the pet sheet 21, so that their length is represented by L1+2·L2 and their width is by W1+2·W2. The liquid absorbent layer 25 is coextensive with the center region 22, so that its length is represented by L1 and its width is by W1. The topsheet 33 is coextensive longitudinally with the pet sheet 21 but laterally with the center region 22, so that its length is represented by L1+2·L2 and its width is by W1.

In the center region 22, the backsheet 31, the liquid absorbent layer 25, the hydrophilic sheet 32 and the topsheet 33 are stacked as shown in FIGS. 3 and 4.

In FIG. 3, the backsheet 31 and the hydrophilic sheet 32 extend beyond the long sides 25a of the liquid absorbent layer 25 to provide the long side regions 23 where the hydrophilic sheet 32 is laid on the backsheet 31.

In FIG. 4, on the other hand, the backsheet 31, the hydrophilic sheet 32 and the topsheet 33 extend beyond the short sides 25b of the liquid absorbent layer 25 to provide the short side regions 24 where the hydrophilic sheet 32 is laid on the backsheet 31 and the topsheet 33 is on the hydrophilic sheet 32.

In the center region 22, the liquid absorbent layer 25 is bonded to the backsheet 31 through a hot-melt type adhesive. A similar adhesive is used for bonding liquid absorbent layer 25 to the hydrophilic sheet 32 and bonding the topsheet 33 to the hydrophilic sheet 32. However, the adhesive used for bonding the liquid absorbent layer 25 to the hydrophilic sheet 32 and bonding the topsheet 33 to the hydrophilic sheet 32 is applied in a spiral, dot or striped pattern in such an amount as not to interfere with liquid migration (e.g., within the range of 0.5 to 10 g/m$^2$).

In both the long side regions 23 and the short side regions 24, the hydrophilic sheet 32 is bonded to the backsheet 31 through a hot-melt type adhesive. In the short side regions 24, furthermore, the topsheet 33 is bonded to the hydrophilic sheet 32 through a similar adhesive that is applied in a spiral, dot or striped pattern in such an amount as not to interfere with liquid migration.

The backsheet 31 is a liquid-impermeable sheet such as a resin film of polyethylene (PE) or a water-repellent or hydrophobic nonwoven fabric. The nonwoven fabric may be a meltblown, a spunbonded, or a laminated material thereof (e.g., a spunbonded-meltblown laminate).

As shown in FIGS. 3 and 4, the liquid absorbent layer 25 includes an absorbent core 26 in the form of a rectangular sheet. The upper side of the absorbent core 26 is covered with a colored hydrophilic sheet 27. The colored sheet 27 is almost coextensive with the absorbent core 26. The lower side of the absorbent core 26 is covered with a hydrophilic sheet 28. Along the long sides 25a of the liquid absorbent layer 25, the sheet 28 is folded back against the upper side of the absorbent core 26 to cover side portions 26a of the absorbent core 26. Thus, side edges 28a of the sheet 28 are located on the colored sheet 27 to provide the liquid absorbent layer 25 with border areas 25c of a width Wa. In the border areas 25c, the sheet 28 extends over the colored sheet 27.

The colored sheet 27 is a hydrophilic tissue paper colored blue, green or red, while the sheet 28 is a white hydrophilic tissue paper.

As shown in FIG. 5, the absorbent core 26 is composed of a fluff pulp (crushed pulp) layer 41, containing first superabsorbent polymer (first SAP) 42, and second superabsorbent polymer (second SAP) 43 located between the fluff pulp layer 41 and the colored sheet 27.

In the present embodiment, the first SAP 42 has a faster liquid absorption rate than the second SAP 43. The first SAP 42 and the second SAP 43 are polymers such as polyacrylic acid, polyvinyl alcohol or maleic anhydride. In order to make the liquid absorption rate of the first SAP 42 faster than that of the second SAP 43, for example, particulate polymer whose surface is cross-linked may be used for the second SAP 43 and particulate polymer whose surface is not cross-linked at all or weakly cross-linked may be used for the first SAP 42. In order to make the liquid absorption rate of the first SAP 42 faster than that of the second SAP 43, alternatively, the particle size of the first SAP 42 may be made smaller than that of the second SAP 43.

The hydrophilic sheet 32 may be a hydrophilic nonwoven fabric such as a spunlaced nonwoven fabric formed of cellulosic fibers (e.g., pulp and rayon) alone or a combination of cellulosic fibers and synthetic resin fibers treated to be hydrophilic, a through-air bonded nonwoven fabric formed of heat-fusible synthetic resin fibers treated to be hydrophilic or a point-bonded nonwoven fabric formed of heat-fusible synthetic resin fibers treated to be hydrophilic. Alternatively, there may be used a spunbonded nonwoven fabric treated to be hydrophilic or a laminated material manufactured by laminating microfibers to a spunbonded nonwoven fabric (e.g., meltblown-spunbonded-meltblown laminate).

In both thickness and basis weight, the hydrophilic sheet 32 is greater than (preferably at least 1.2 times, more preferably at least 1.5 times) the tissue papers used for the colored sheet 27 and the sheet 28.

The topsheet 33 may be an apertured resin film (e.g., apertured PE film) formed with a large number of apertures 33a for allowing liquid passage. Preferably, a whitening agent such as titanium oxide is added to the resin film. More specifically, the topsheet 33 is a so-called perforated film in which the apertures 33a are formed by softening a resin film on a net-like or apertured base and then sucking the resin film from the underside of the net-like or apertured base.

In this perforated film, as shown in FIG. 5 on an enlarged scale, the individual apertures 33a are through-holes extending in the thickness direction of the film and tapered toward the liquid absorbent layer 25. The area ratio of the apertures 33a to the topsheet 33 is in the range of 10 to 60%. The perforated film may be treated to be hydrophilic such as by applying a surfactant to the film surface or kneading the resin with a surfactant.

From above the pet sheet 21, the color of the colored sheet 27 can be seen through the topsheet 33 and the hydrophilic sheet 32 in the center region 22. When the colored sheet 27 is blue, the center region 22 takes on a white-blue (or bluish white) color. However, since the white sheet 28 is laid on the colored sheet 27 in the border areas 25c of the liquid absorbent layer 25, the center region 22 is more white (or less bluish) in the border areas 25c than in an intermediate area between the border areas 25c.

In the pet sheet 21 of FIG. 1, furthermore, the side regions 23, 24 outside the generally white-blue center region 22 are substantially white.

Alternatively, the topsheet 33 may be a hydrophilic nonwoven fabric, an apertured nonwoven fabric, or a laminated material of an apertured resin film and a nonwoven fabric. Also in this case, the color of the colored sheet 27 need be seen through the topsheet 33.

Urine applied to the center region 22 can be absorbed and retained in the liquid absorbent layer 25 via the hydrophilic sheet 32 after passing through the apertures 33a of the topsheet 33. Since the second SAP 43 having a slow liquid absorption rate is located beneath the colored sheet 27 and the first SAP 42 having a faster liquid absorption rate than the second SAP 43 is dispersed in the fluff pulp layer 41, the liquid absorbent layer 25 can retain much water as a whole. At the same time, the second SAP 43, which is located between the fluff pulp layer 41 and the colored sheet 27 and which has a slow liquid absorption rate, hardly interferes with liquid migration, allowing rapid permeation into the fluff pulp layer 41.

Since the first SAP 42 having a fast liquid absorption rate is dispersed in the fluff pulp layer 41, urine introduced into the fluff pulp layer 41 can be quickly absorbed by the first SAP 42, which inhibits diffusion of urine inside the fluff pulp layer 41. Therefore, even when the pet sheet 21 is used for a long time, urine will not leave a noticeable stain on the pet sheet 21. Thus, the pet sheet 21 is suitable for long time use.

In the topsheet 33, moreover, the individual apertures 33a are tapered toward the liquid absorbent layer 25, as shown in FIG. 5. Therefore, urine absorbed in the liquid absorbent layer 25 is inhibited from oozing out to the surface of the topsheet 33.

On the other hand, urine applied to the side regions 23, 24 may be absorbed and retained in the hydrophilic sheet 32 outside the center region 22 or migrate to the center region 22 via the hydrophilic sheet 32 for absorption and retention in the liquid absorbent layer 25. Thus, urine applied to the side regions 23, 24 can also be retained so as not to flow out of the pet sheet 21. Since the hydrophilic sheet 32 is in contact with the liquid absorbent layer 25, urine applied to the side regions 23, 24 can be readily drawn into the liquid absorbent layer 25 via the hydrophilic sheet 32. In addition, since the hydrophilic sheet 32 is greater in thickness and basis weight than the tissue papers used for the colored sheet 27 and the sheet 28, it is effective in preventing urine from flowing along or puddling in the side regions 23, 24.

Pets such as dogs or cats are trained to micturate or defecate on the pet sheet 21 with their feet on the center region 22. This can be accomplished without difficulty because the center region 22 takes on a color different from that of the side regions 23, 24 due to the presence of the colored sheet 27. Even in this case, urine may sometimes be applied to the side regions 23, 24 outside the center region 22, but urine applied to the side regions 23, 24 can be readily absorbed in the liquid absorbent layer 25 via the hydrophilic sheet 32 as described hereinabove.

Figure 6:
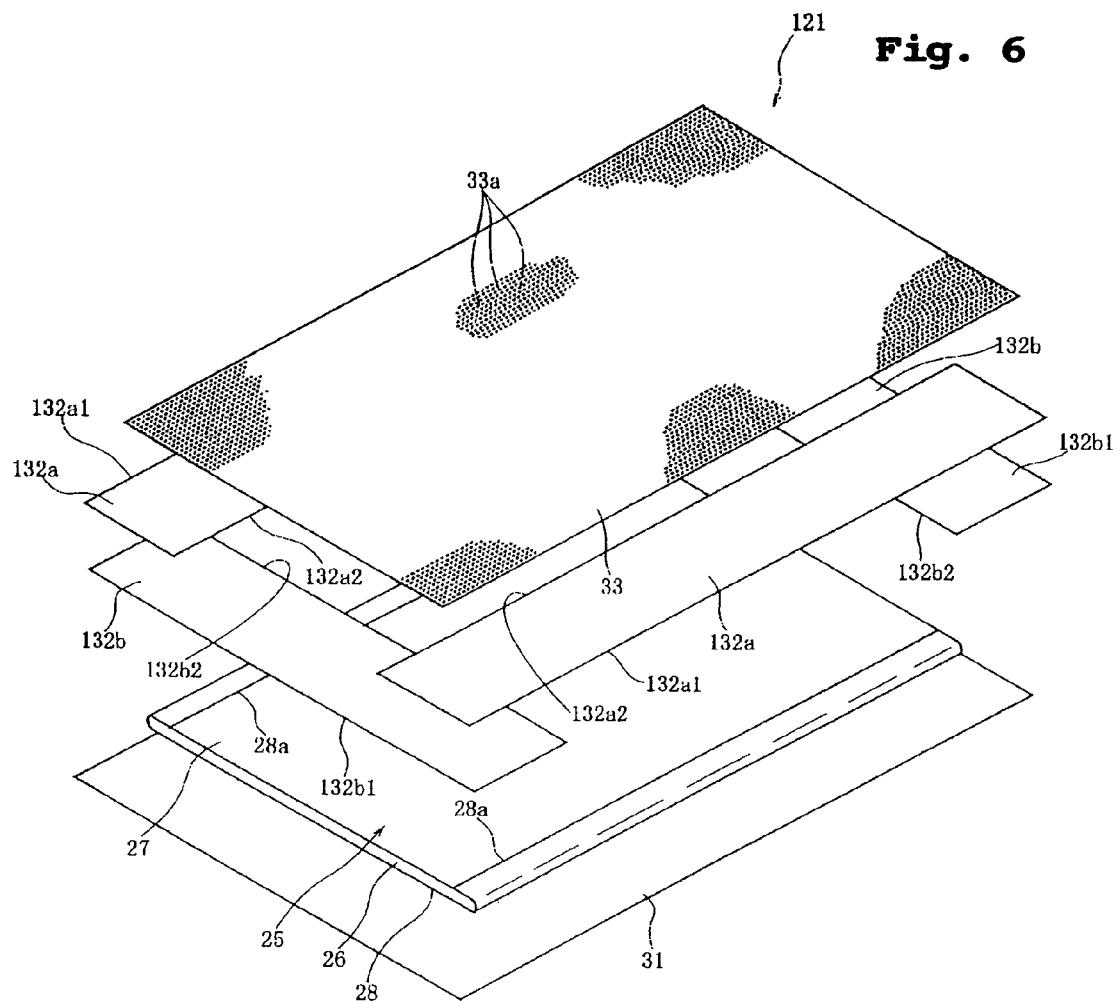
FIG. 6 is an exploded perspective view showing individual components of a pet sheet according to a second embodiment of the present invention.
Figure 7:
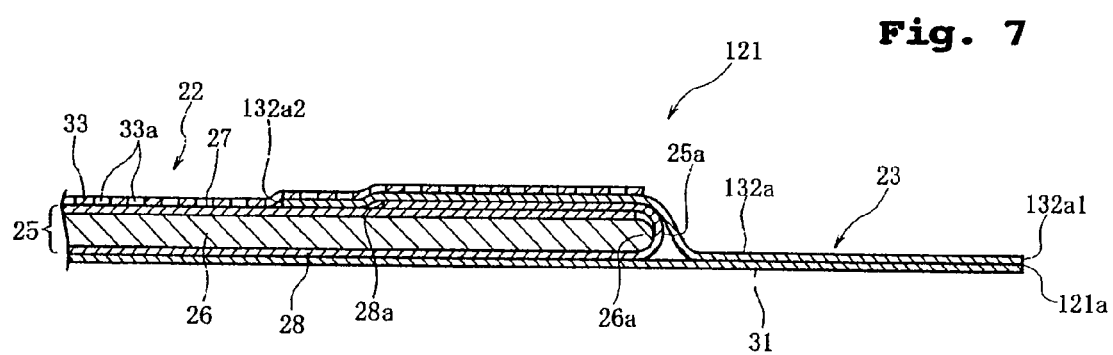
FIG. 7 is a sectional view corresponding to FIG. 3 and showing the pet sheet of the second embodiment.
Figure 8:
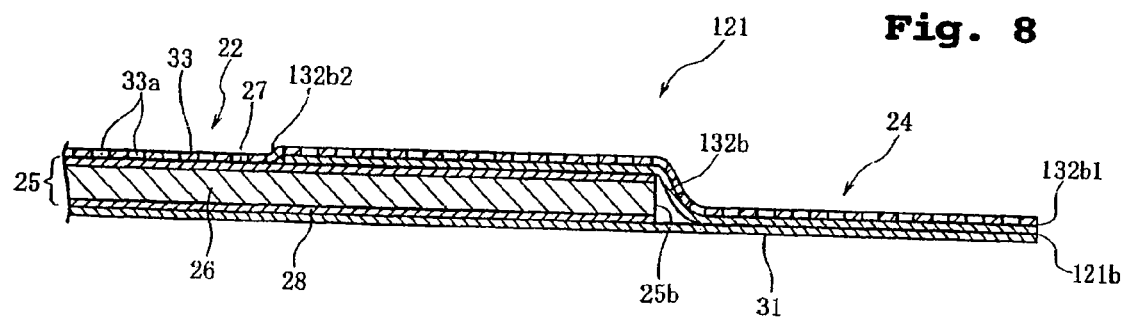
FIG. 8 is a sectional view corresponding to FIG. 4 and showing the pet sheet of the second embodiment.

FIGS. 6 to 8 show a pet sheet 121 according to a second embodiment of the present invention. FIG. 6 is an exploded perspective view showing individual components of the pet sheet 121; FIG. 7 is a sectional view corresponding to FIG. 3; and FIG. 8 is a sectional view corresponding to FIG. 4. Hereinbelow the detailed description of the portions having the same construction as those of the first embodiment will be omitted by designating them by the common reference numerals.

As shown in FIG. 6, the pet sheet 121 has the backsheet 31, the liquid absorbent layer 25 and the topsheet 33 as in the pet sheet 21 of the first embodiment.

For the pet sheet 121, however, a pair of strip-shaped long-side hydrophilic sheets 132a and a pair of strip-shaped short-side hydrophilic sheets 132b are used in place of the hydrophilic sheet 32 of the first embodiment. The hydrophilic sheets 132a, 132b are of the same material as the hydrophilic sheet 32.

As shown in FIG. 7, the long-side hydrophilic sheets 132a are disposed along long sides 121a of the pet sheet 121 to provide the long side regions 23 where the long-side hydrophilic sheets 132a are laid on and bonded to the upper side of the backsheet 31. Of the long-side hydrophilic sheet 132a, one edge 132a1 coincides with the long side 121a, while another edge 132a2 is located on the liquid absorbent layer 25 so that the long-side hydrophilic sheet 132a overlaps with the liquid absorbent layer 25.

As shown in FIG. 8, the short-side hydrophilic sheets 132b are disposed along short sides 121b of the pet sheet 121 to provide the short side regions 24 where the short-side hydrophilic sheets 132b are located between the backsheet 31 and the topsheet 33. Of the short-side hydrophilic sheet 132b, one edge 132b1 coincides with the short side 121b, while another edge 132b2 is located on the liquid absorbent layer 25 so that the short-side hydrophilic sheet 132b overlaps with the liquid absorbent layer 25.

In the pet sheet 121, the liquid absorbent layer 25 is located immediately beneath the topsheet 33 centrally of the center region 22. Therefore, urine applied to the center region 22 can be absorbed in the liquid absorbent layer 25 immediately after passing through the apertures 33a of the topsheet 33, without being diffused through the hydrophilic sheet 32.

Also in the second embodiment, since the hydrophilic sheets 132a, 132b overlap with the liquid absorbent layer 25, urine applied to the side regions 23, 24 can be readily drawn into the liquid absorbent layer 25 via the hydrophilic sheets 132a, 132b.

Figure 9:
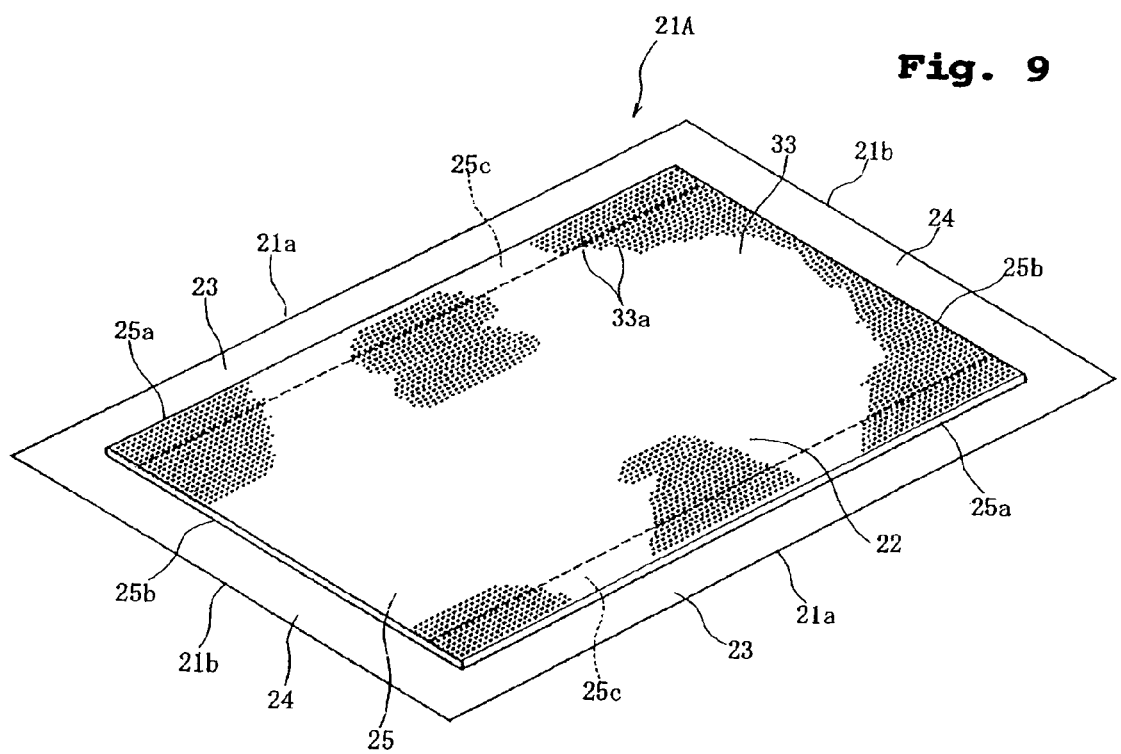
FIG. 9 is a perspective view showing a modification of the first embodiment.
Figure 10:
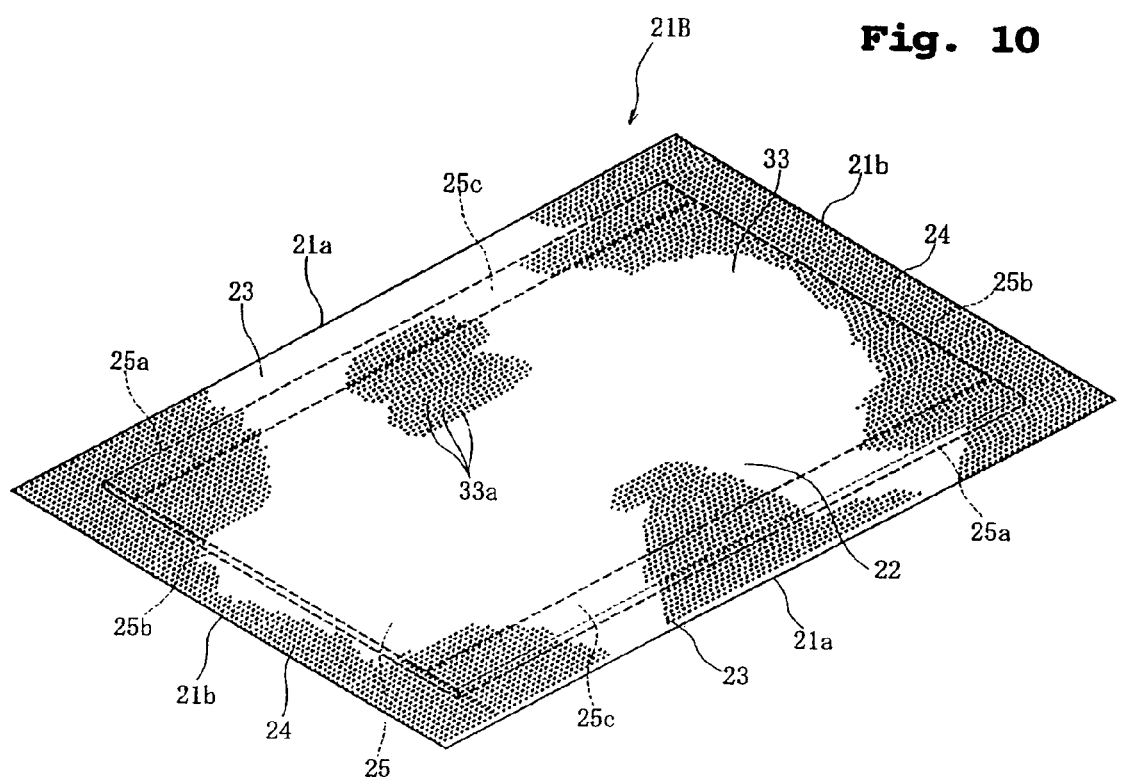
FIG. 10 is a perspective view showing another modification of the first embodiment.

FIGS. 9 and 10 show modifications of the pet sheet 21. Of course, the pet sheet 121 according to the second embodiment may be likewise modified.

FIG. 9 shows a pet sheet 21A in which the topsheet 33 is made smaller than in the pet sheet 21 so as to be coextensive with the center region 22. That is, the topsheet 33 is located exclusively above the liquid absorbent layer 25, so that the hydrophilic sheet 32 is exposed externally in both the side regions 23, 24. In this case, urine applied to the side regions 23, 24 can be immediately absorbed in the hydrophilic sheet 32.

FIG. 10 shows a pet sheet 21B in which the topsheet 33 is made coextensive with the backsheet 31 and the hydrophilic sheet 32. That is, not only the center region 22 and the short side regions 24 but also the long side regions 23 are covered with the topsheet 33. In this case, the color of urine applied to the side regions 23, 24 and absorbed in the hydrophilic sheet 32 can be concealed by the topsheet 33.

Figure 11:
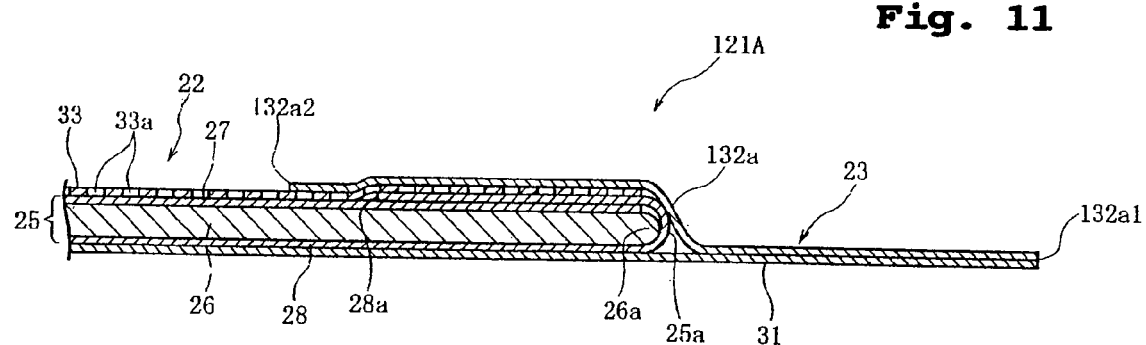
FIG. 11 is a sectional view corresponding to FIG. 3 and showing a modification of the second embodiment.
Figure 12:
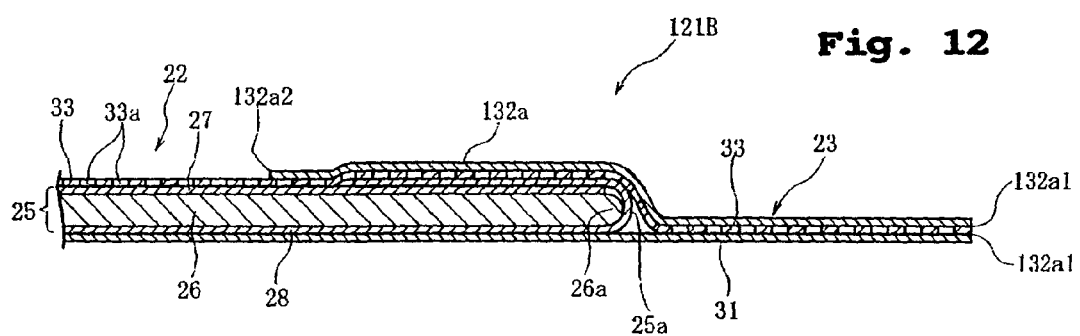
FIG. 12 is a sectional view corresponding to FIG. 3 and showing another modification of the second embodiment.
Figure 13:
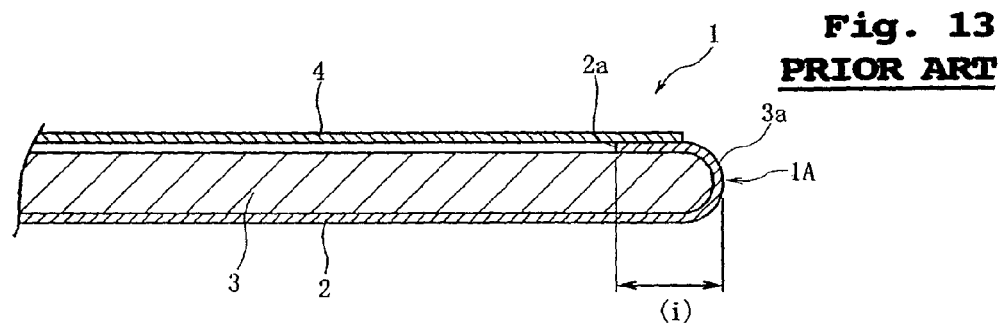
FIG. 13 is a sectional view showing a conventional pet sheet.

FIGS. 11 and 12 show modifications of the pet sheet 121. FIGS. 11 and 12 are sectional views corresponding to FIG. 7.

FIG. 11 shows a pet sheet 121A in which the long-side hydrophilic sheets 132a and the short-side hydrophilic sheets 132b (not shown) are fixed on the topsheet 33 in the center region 22.

FIG. 12 shows a pet sheet 121B in which the topsheet 33 extends into both the side regions 23, 24 (not shown). In the side regions 23, 24, the extensions of the topsheet 33 are fixed on the backsheet 31. Thus, the long-side hydrophilic sheets 132a and the short-side hydrophilic sheets 132b (not shown) are fixed on the topsheet 33 not only in the center region 22 but also in the side regions 23, 24.

Accordingly, urine applied to the side regions 23, 24 may be absorbed and retained in the hydrophilic sheet 132a, 132b or migrate to the center region 22 via the hydrophilic sheets 132a, 132b and pass through the apertures 33a of the topsheet 33 for absorption and retention in the underlying liquid absorbent layer 25.

Although the present invention has been illustrated and described with respect to exemplary embodiments thereof, it should be understood by those skilled in the art that the foregoing and various other changes, omission and additions may be made therein and thereto, without departing from the spirit and scope of the present invention. Therefore, the present invention should not be understood as limited to the specific embodiments set out above but to include all possible embodiments which can be embodied within a scope encompassed and equivalent thereof with respect to the features set out in the appended claims.

What is claimed is:

1. A pet sheet comprising:
   a backsheet;
   a liquid-permeable topsheet;
   a liquid absorbent layer which is smaller than the backsheet and disposed between the backsheet and the topsheet, the backsheet extending beyond the liquid absorbent layer to provide side regions outside the liquid absorbent layer;
   a first hydrophilic sheet that is different from the topsheet provided above the entire liquid absorbent layer and above the backsheet in the side regions; and
   a second hydrophilic sheet provided below the liquid absorbent layer and in direct contact with the backsheet, said second hydrophilic sheet being folded back against a top surface of the liquid absorbent layer to cover side portions of the liquid absorbent, the folded back portion of the second hydrophilic sheet being in direct contact with said first hydrophilic sheet,
   wherein the topsheet is provided above the first hydrophilic sheet and the entire liquid absorbent layer, and
   wherein said pet sheet is configured to permit passage of fluid through said first hydrophilic sheet to the liquid absorbent layer.

2. The pet sheet according to claim 1, wherein both the backsheet and the liquid absorbent layer are rectangular and the side regions are provided along all four sides of the liquid absorbent layer.

3. The pet sheet according to claim 1, wherein in the side regions, the first hydrophilic sheet is laid on the backsheet.

4. The pet sheet according to claim 1, wherein the topsheet extends beyond the liquid absorbent layer to cover the first hydrophilic sheet laid on the backsheet in the side regions.

5. The pet sheet according to claim 1, wherein the first hydrophilic sheet extends between the liquid absorbent layer and the topsheet and beyond the liquid absorbent layer into the side regions.

6. The pet sheet according to claim 1, wherein the first hydrophilic sheet is laid on and in direct contact with the backsheet in the side regions.

7. The pet sheet according to claim 1, wherein the topsheet comprises an apertured resin film.

8. The pet sheet according to claim 1, wherein a width of the topsheet is equal to a width of the absorbent layer.

9. The pet sheet according to claim 1, wherein the first hydrophilic sheet is laid on and in direct contact with the backsheet.

10. The pet sheet according to claim 1, wherein direct contact between the first hydrophilic sheet and the liquid absorbent layer in a peripheral portion of a center region enables liquid applied to the side regions to migrate to the liquid absorbent layer.

11. A pet sheet comprising:
    a backsheet;
    a liquid-permeable topsheet;
    a liquid absorbent layer which is smaller than the backsheet and disposed between the backsheet and the topsheet, wherein the backsheet extends beyond the liquid absorbent layer to provide side regions outside the liquid absorbent layer;
    a pair of hydrophilic strips, different from the topsheet, provided to cover opposite longitudinal edge regions of the liquid absorbent layer, wherein a portion of each hydrophilic strip is provided above and in direct contact with side regions of the backsheet; and
    a hydrophilic sheet provided on the liquid absorbent layer and having a color different from a color of the portion of each hydrophilic strip provided above and in direct contact with the side regions of the backsheet;
    wherein the topsheet is laid on and in direct contact with the hydrophilic sheet in a central portion of the liquid absorbent layer and wherein the topsheet is laid on and in direct contact with the entire portions of the hydrophilic strips that cover the opposite longitudinal edge regions of the liquid absorbent layer, and
    wherein the pet sheet is configured to permit passage of fluid through the hydrophilic strips to the absorbent layer.

12. The pet sheet according to claim 11, wherein the hydrophilic strips are laid on and in direct contact with the backsheet in the side regions and on and in direct contact with a peripheral portion the liquid absorbent layer without covering a central portion of the liquid absorbent layer.

13. The pet sheet according to claim 11, wherein the topsheet is laid on and in direct contact with the hydrophilic strips in a peripheral portion of the liquid absorbent layer and on and in direct contact with the hydrophilic sheet in a central portion of the liquid absorbent layer.

* * * * *